United States Patent [19]

Kaun

[11] Patent Number: 5,536,600

[45] Date of Patent: Jul. 16, 1996

[54] LI-ALLOY ELECTRODE FOR LI-ALLOY/METAL SULFIDE CELLS

[76] Inventor: Thomas D. Kaun, 320 Willow St., New Lenox, Ill. 60451

[21] Appl. No.: 311,627

[22] Filed: Sep. 23, 1994

[51] Int. Cl.[6] .............................. H01M 4/40; H01M 4/38
[52] U.S. Cl. .................................... 429/223; 429/221
[58] Field of Search ..................... 29/623.1; 429/218, 429/223, 212, 217, 199; 264/104; 420/400, 578, 590; 469/66, 67

[56] References Cited

U.S. PATENT DOCUMENTS

| | | | |
|---|---|---|---|
| 3,488,221 | 1/1970 | Shimotake et al. | 429/103 |
| 4,324,846 | 4/1982 | Kaun et al. | 429/112 |
| 4,358,513 | 11/1982 | Kaun | 429/103 |
| 4,386,019 | 5/1983 | Kaun et al. | 252/503 |
| 4,446,212 | 5/1984 | Kaun | 429/103 |
| 4,489,143 | 12/1984 | Gilbert et al. | 429/103 |
| 4,540,642 | 9/1985 | Kaun | 429/131 |
| 4,728,590 | 3/1988 | Redey | 429/221 |
| 4,764,437 | 8/1988 | Kaun | 429/50 |

*Primary Examiner*—Kathryn Gorgos
*Attorney, Agent, or Firm*—Timothy Harney; Hugh Glenn; William R. Moser

[57] ABSTRACT

A method of making a negative electrode, the electrode made thereby and a secondary electrochemical cell using the electrode. Lithium, silicon and nickel is alloyed in a prescribed proportion forming an electroactive material, to provide an improved electrode and cell.

8 Claims, 7 Drawing Sheets

LI-ALLOY ELECTRODE FOR LI-ALLOY/METAL SULFIDE CELLS

CONTRACTUAL ORIGIN OF THE INVENTION

The United States Government has rights in this invention pursuant to Contact No. W-31-109-ENG-38 between the U.S. Department of Energy and Argonne National Laboratory.

BACKGROUND OF THE INVENTION

The present invention relates to electrodes for use in secondary electrochemical cells. More particularly, it concerns a method of making a negative electrode composition, the electrode composition made thereby and the secondary electrochemical cell containing the electrode, wherein the negative electrode composition includes a lithium alloy including silicon and nickel.

A substantial amount of work has been done in the development of high temperature secondary electrochemical cells of the general type described in Shimotaki et al, U.S. Pat. No. 3,488,221 issued Jan. 6, 1970 and in particular in my prior U.S. Pat. No. 4,764,437 issued Aug. 16, 1988 assigned to the assignee of this invention, the entire disclosure of which is incorporated herein by reference. Typical secondary cells have long shelf lives, may be completely and repeatedly charged and discharged at either rapid or slow rates, and can produce extremely high currents for short periods of time. Secondary cells of this general type have uses in space and other remote areas.

In such high temperature secondary electrochemical cells discussed above, the positive electrode generally has been formed with chalcogens such as sulfur, oxygen, selenium or tellerium, as well as their transition metal chalcogenides, and have included iron disulfide in addition to the sulfides of iron, cobalt, nickel and copper.

In high temperature cells, current flow between electrodes often is transmitted by molten electrolytic salt. Particularly useful salts include compositions of alkali metal halides and/or alkaline earth metal halides ordinarily incorporating a salt of the negative electrode-active metal, such as lithium, see column 2 of the Shimotaki et al, U.S. Pat. No. 3,488,221. One problem with many of the electrolytes available is the limited dynamic range for which the electrolyte will remain liquid, at a specific temperature, to avoid the electrolyte from solidifying in the electrodes as the concentration of positive ions changes during cell operations.

Alkali metals such as lithium, sodium, potassium or alkaline metals including calcium, magnesium, etc. along with the alloys of these materials, have been used as negative electrode active materials. Alloys of these materials such as lithium-aluminum, lithium-silicon, lithium- aluminum-silicon, lithium-magnesium as well as many others have been used to improve retention of the electrode material at the high operating temperatures of these secondary electrochemical cells.

In the past, negative electrode materials were prepared by various metallurgical techniques such as those disclosed in U.S. Pat. No. 4,489,143 issued Dec. 18, 1984, assigned to the assignee of the present invention, the disclosure of which is incorporated herein by reference. In that patent, the negative electrode was prepared by forming a molten alloy of iron and aluminum. The melt was solidified and comminuted to particles of aluminum-iron alloy in the specified proportions. Thereafter, the alloy particles were integrated into a porous, electrically conductive substrate. Other metallurgical techniques such as casting or extruding are also discussed.

A secondary electrochemical cell and a negative electrode is disclosed in U.S. Pat. No. 4,324,846 issued Apr. 13, 1982 to Kaun et al., assigned to the assignee of this invention, which is incorporated herein by reference. The electrode comprises a lithium-aluminum alloy and a ternary alloy of lithium, aluminum, and iron or cobalt in an amount sufficient to allow a five percent overcharge capacity.

A secondary cell and a method of making an electrode for said secondary cell was disclosed in U.S. Pat. No. 4,386,019 issued May 31, 1983 to Kaun et al., assigned to the assignee of this invention, which is incorporated herein by reference. Said electrode comprising a lithiumaluminum alloy, an electrolyte and a material selected from graphitized carbon, aluminum-iron alloy or mixtures thereof.

The disadvantage of previous cells incorporating a lithium-aluminum electrode was discussed in my previous patent, U.S. Pat. No. 4,446,212 issued May 1, 1984 assigned to the assignee of this invention, which is incorporated herein by reference. The invention therein includes the addition of an aluminum-iron alloy, and/or graphitized carbon and/or magnesium oxide to the negative electrode.

This invention provides a new Li-alloy electrode with improved cell performance and battery durability. The Li-SiNi electrode provides higher lithium activity at near full charge state for a lithium shuttle, creating overcharge tolerance with the added feature of having a higher cell voltage on discharge.

SUMMARY OF THE INVENTION

It is an object of the present invention to provide a method of making a negative electrode and an electrode made thereby for use in a secondary electrochemical cell and a cell incorporating such electrode.

It is yet another object to significantly limit the amount of lithium held in the alloy that has activity too low (e.g. $\geq 50$ mV vs LiAl) for high power battery application.

It is a further object to provide a particulate lithium alloy, with silicon and nickel, for use in a negative electrode which exhibits a higher cell voltage when placed in a secondary electrochemical cell, while providing a relatively constant output voltage during cell discharge.

Additional objects, advantages and novel features of this invention will become apparent to those skilled in the art upon examination of the following and by practice of the invention.

In accordance with the present invention, a negative electrode is formed from particulate of lithium alloy with silicon and nickel. The negative electrode includes a lithium-silicon-nickel alloy containing lithium in the range of from about 0.1 to about 70 atom percent, silicon in the range of from about 17 to about 57 atom percent, and nickel in the range of from about 14 to about 43 atom percent. These particles may be cold-pressed into a plate for use as an negative electrode of a battery cell.

Another aspect of the invention includes a method of making a negative electrode that includes alloy particles of silicon and nickel and forming said mixture into an electrode. One method of making the electrode provides silicon in a range of from about 43 to about 57 atom percent and nickel in a range of from about 57 to about 43 atom percent. The silicon-nickel particles mixed with salt particles (LiCl- LiBr-KBr) are formed into a slurry in a carrier inert to lithium alloys, silicon and nickel, where the carrier is present in the range from about 10 percent by volume to about 50 percent by volume of the mixture and thereafter forming the slurry into the desired electrode shape and evaporating the carrier. The desired electrode shape may be formed by a slurry that is extrudable into a defined form, wherein the slurry is a paste.

In a second method of making the electrode, the lithium-silicon-nickel alloy particles and salt particles are formed into a slurry in a solvent, and then mixed with a polymeric solution, where the polymeric solution is present in the range of from about 5 percent by weight to about 50 percent by weight of the solvent and thereafter forming the slurry into the desired electrode shape and evaporating the solvent.

Another aspect of this invention includes a secondary electrochemical cell having a positive electrode, a negative electrode, and an electrolyte separator (salt/MgO), where the positive electrode includes an active material of a transition metal chalcogen, preferably iron disulfide, the negative electrode includes a formed particulate lithium alloy with silicon and nickel, and the electrolyte/separator includes lithium and halide ions providing ionic communication between said positive and negative electrodes.

DESCRIPTION OF THE DRAWINGS

The present invention is illustrated in the following drawings wherein.

DETAILED DESCRIPTION OF THE INVENTION

Figure 1:
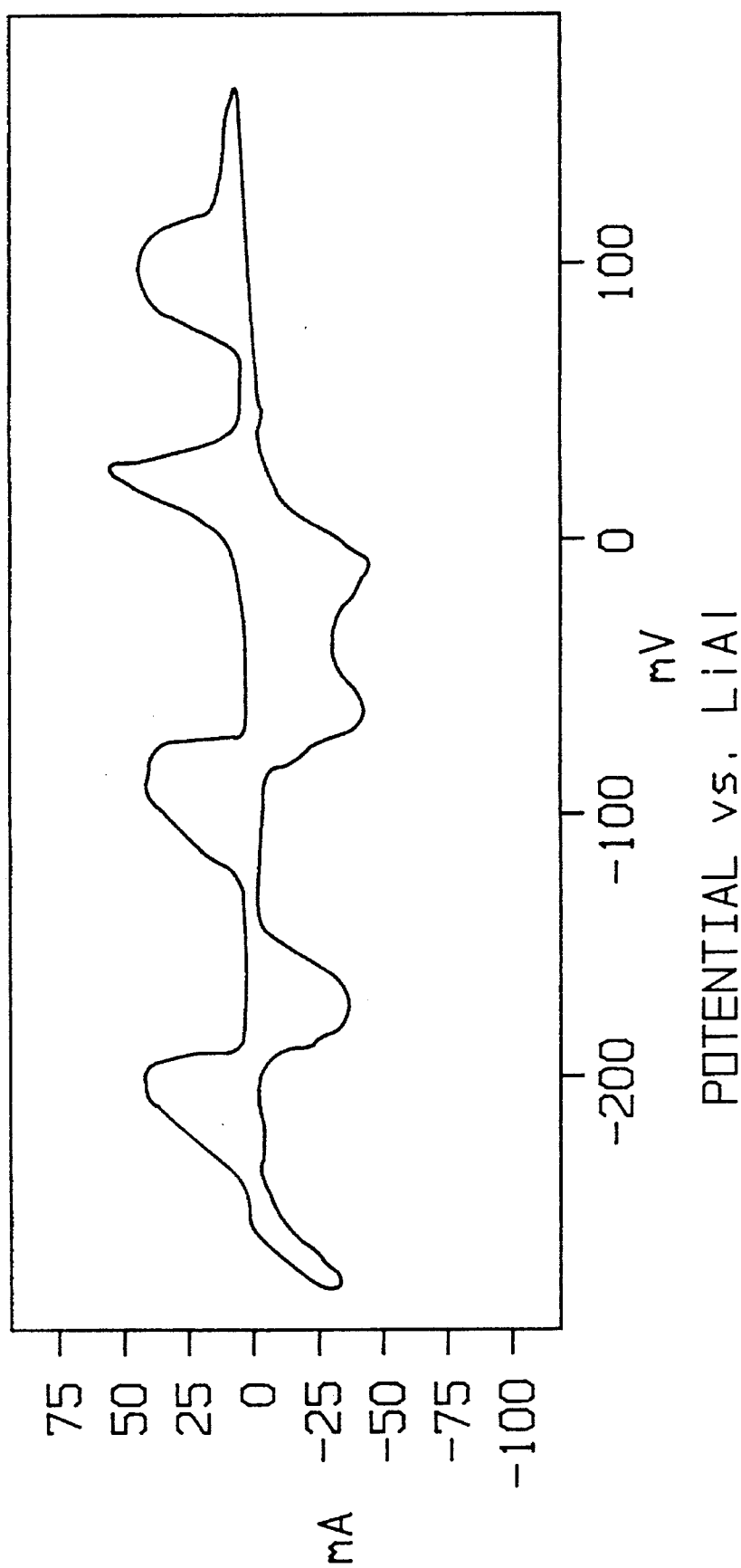
FIG. 1 is a graph of the cyclic voltamogram of Li alloyed with Si (composition of 25 mg Si at 410° C. in a LiCl—LiBr—KBr electrolyte.

The improved method and electrode made thereby, and electrochemical cell of this invention is particularly useful with an iron disulfide positive electrode, an electrolyte containing LiCl—LiBr—KBr and a ternary lithium alloy with silicon and nickel as the negative electrode.

Lithium in the range of from about 0.1 to about 70 is added by a pyrochemical method or by electro-deposition into the Si—Ni alloy to form the lithium alloy. The lithium concentration is limited by its propensity to form molten phases with the alloy components at high temperatures and at a high lithium concentrations The alloy of $Li_{4.5}NiSi_{1.3}$ or 66 percent lithium is selected as a practical limit for cells operating in the 350° C. to 550° C. temperature range suitable for molten electrolytes. Higher lithium concentrations may be selected for cells capable of operating at lower temperatures such as with molten salt eutectics having low melting points or with aqueous or organic-based electrolytes containing lithium ions.

As set forth in patent no. '843, the negative electrode can be prepared by various metallurgical techniques. One preferred method of preparing the ternary electrode material is by powder metallurgy in which a requisite amount of powders are mixed and formed under pressure such as 87 mega-Pascals to form the electrode and sinter at a temperature below the melting point of the lowest melting constituent. Other metallurgical techniques such as forming a molten alloy of iron and aluminum or cobalt and aluminum or nickel and aluminum at a temperature above the melting point of aluminum but below the melting point of iron, cobalt or nickel. For the alloys contemplated in that patent, temperatures of 1200° C. or above are satisfactory in the absence of lithium. The melt is solidified and comminuted to particles of the alloy in specified proportions. Thereafter, the alloy particles are integrated into a porous, electrically conductive substrate. This is achieved by compacting the particles together with a powdered electrolyte by pressing, vibrating, or otherwise distributing the particles into a porous electrically conductive substrate or by bonding the particles with a combination of thermosetting material to form a porous electrically conductive substrate.

Another method of making the negative electrode of tiffs invention, as disclosed in the '143 patent involves forming a slurry of the lithium, silicon and nickel alloy particles in a dry petrochemical carrier inert to lithium alloys such as petroleum ether, toluene, kerosene, hexane or combinations thereof, such that the resultant slurry is a spreadable and extrudable paste. The preferred amount of organic carrier is about 30 percent by volume; however, the carrier may be present in an amount up to 50 volume percent or be as low as 10 volume percent, depending on the particle size and desired viscosity.

If the inert carrier is present in an amount greater than 50 volume percent, then the slurry becomes too runny and does not retain its shape upon extrusion. Moreover, the amount of heat required to drive off the solvent and the handling costs are greater. However, if less than about 10 volume percent inert carrier is used to form the slurry, then the close packing and protective nature of the carrier is not obtained, and the method in not advantageous.

By selecting an inert dry petrochemical carrier such as petroleum ether, toluene, kerosene, hexane or combinations thereof, several benefits are obtained, as disclosed in the U.S. Pat. No 4,358,513 issued Nov. 9, 1982, assigned to the assignee of the present invention, which in incorporated herein by reference. As discussed in the '513 patent, a closer particle packing density is obtained with the slurry, when compared to dry powder packing. Because the carrier apparently provides some lubricating properties, the particles pack more densely than dry powder packing. Typically, lithium-aluminum dry packing results in 50 percent of theoretical density to give a load density of about 0.7 amp-hours/cc which is marginal for producing high-specific-energy cells. The aforesaid inert hydrocarbon slurry technique enables a 1.0 amp-hour/cc loading density even with the silicon and nickel alloying elements.

Another method of making the negative electrode of this invention involves forming a slurry of the lithium alloy, silicon and nickel particles in a solvent such as petroleum ether, and mixing the slurry with a polymeric solution such as polyisobutylene, and thereafter forming the slurry into the desired electrode shape and evaporating the solvent. The preferred amount of polymeric solution is about 30 percent by weight, however, the solvent may be present in an amount up to 99 percent be weight or be as low as 90 percent by weight of the polymeric solution depending on the Li-alloy particle size and desired viscosity of the slurry.

The novel electrodes of the present invention, where the electrode is formed by a mixture of lithium-silicon-nickel alloy particles into a ternary alloy phase, such that lithium is present in a range of from about 0.1 to about 70 atom percent, silicon is present in a range of from about 17 atom percent to about 57 atom percent, and nickel is present in a range of from about 14 to about 43 atom percent may be made by any of the methods previously set forth. Specifically, the novel electrodes of the present invention may be made by forming the lithium alloy powder with silicon and nickel and thereafter cold pressing the electrodes into the desired shape. Also, the slurry method previously described is useful for the electrodes of the present invention in which the particulate electrode active material is formed into a slurry with an inert carrier of the type previously disclosed. As stated before, the advantages of this technique are in providing negative electrodes in wider variety of shapes than is possible with cold pressing, while retaining the same load density. It is also clear that the negative electrodes of the present invention may be formulated with or without the presence of electrolyte, but in electrochemical cells of the type herein discussed, electrolyte is usually present in the range of from about 20 percent by volume to about 50 percent by volume of the negative electrode.

Referring now to FIGS. 1–6, materials for negative electrodes are compared to each other to illustrate the advantages of the inventive electrodes. FIGS. 2–5 graphically demonstrate the capacity and potential of lithium alloyed with Si—Ni (composition range of $Si_2Ni$ to $SiNi_{1.3}$) evaluated by cyclic voltammetry at 400° C. in a LiCL—LiBR—KBr electrolyte. As further provided below, the materials with low nickel content ($Li_xSi_2Ni$) show only a slight modification in electrochemistry when compared with Li—Si, and the lithium capacity is diminished. On the other hand, materials with higher nickel contents ($Li_xSi_{1.3}$, $Li_x$-SiNi and $Li_xSiNi_{1.3}$) exhibit an average discharge potential that is 150 to 200 mV negative to LiAl and provides an higher cell voltage on discharge. Also, a greater portion of the lithium present in the alloy is available for battery-cell capacity, as compared to Li—Si.

FIG. 1 is a cyclic voltamogram of Li—Si compared to LiAl at a scan rate of 0.02 mV/sec.

Figure 2:
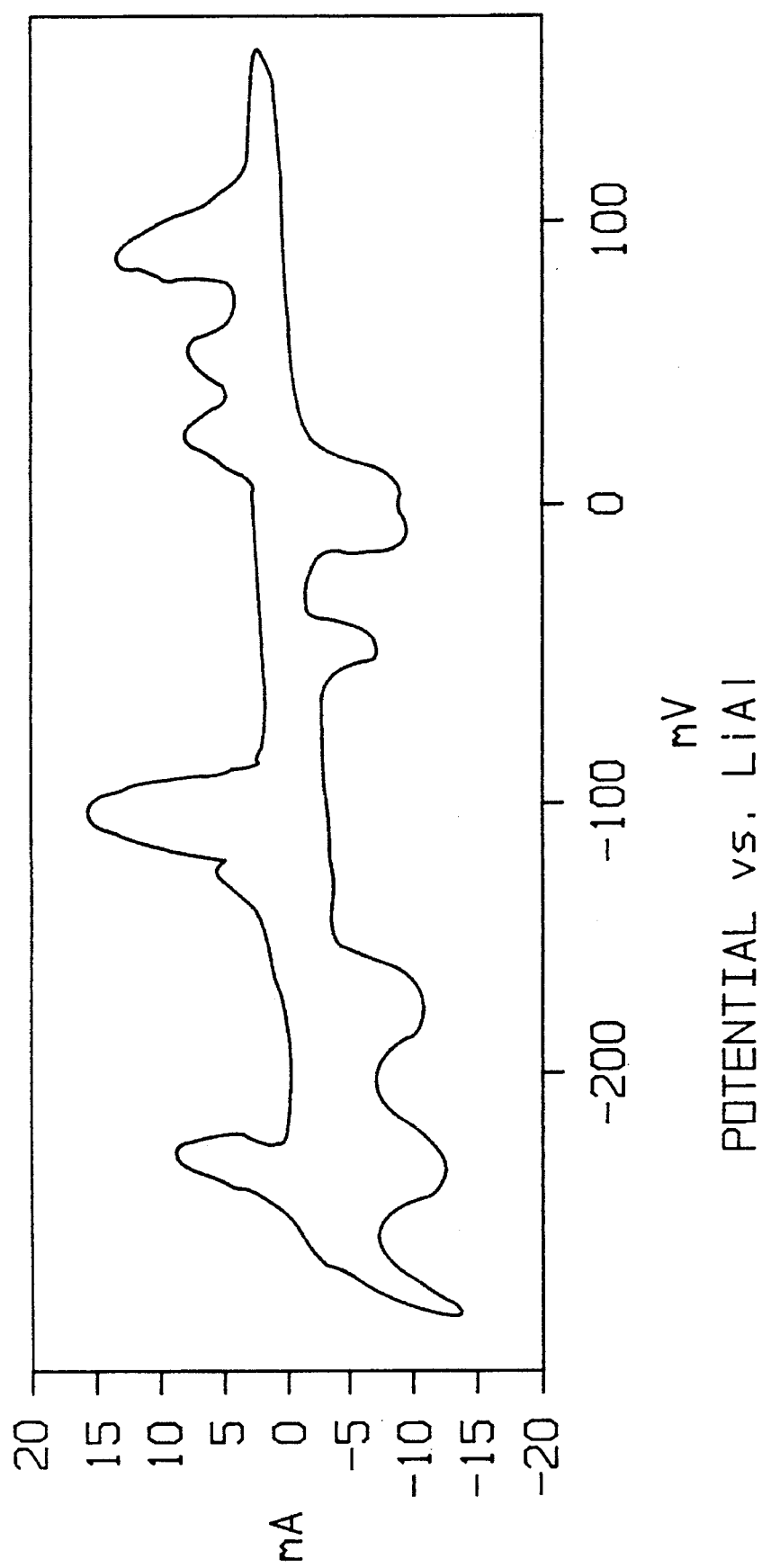
FIG. 2 is a graph of the cyclic voltamogram Li alloyed with Si—Ni (composition of 50 mg $NiSi_2$) at 380° C. in a LiCl—LiBr—KBr electrolyte.

FIG. 2 is a cyclic voltamogram of Li—$NiSi_2$ compared to LiAl at a scan rate of 0.02 mV/sec. Li—$NiSi_2$, having a low nickel content has increased capacity at a discharge potential –100mVolts versus LiAl, a slight modification in electrochemistry when compared with the Li—Si electrode.

Figure 3:
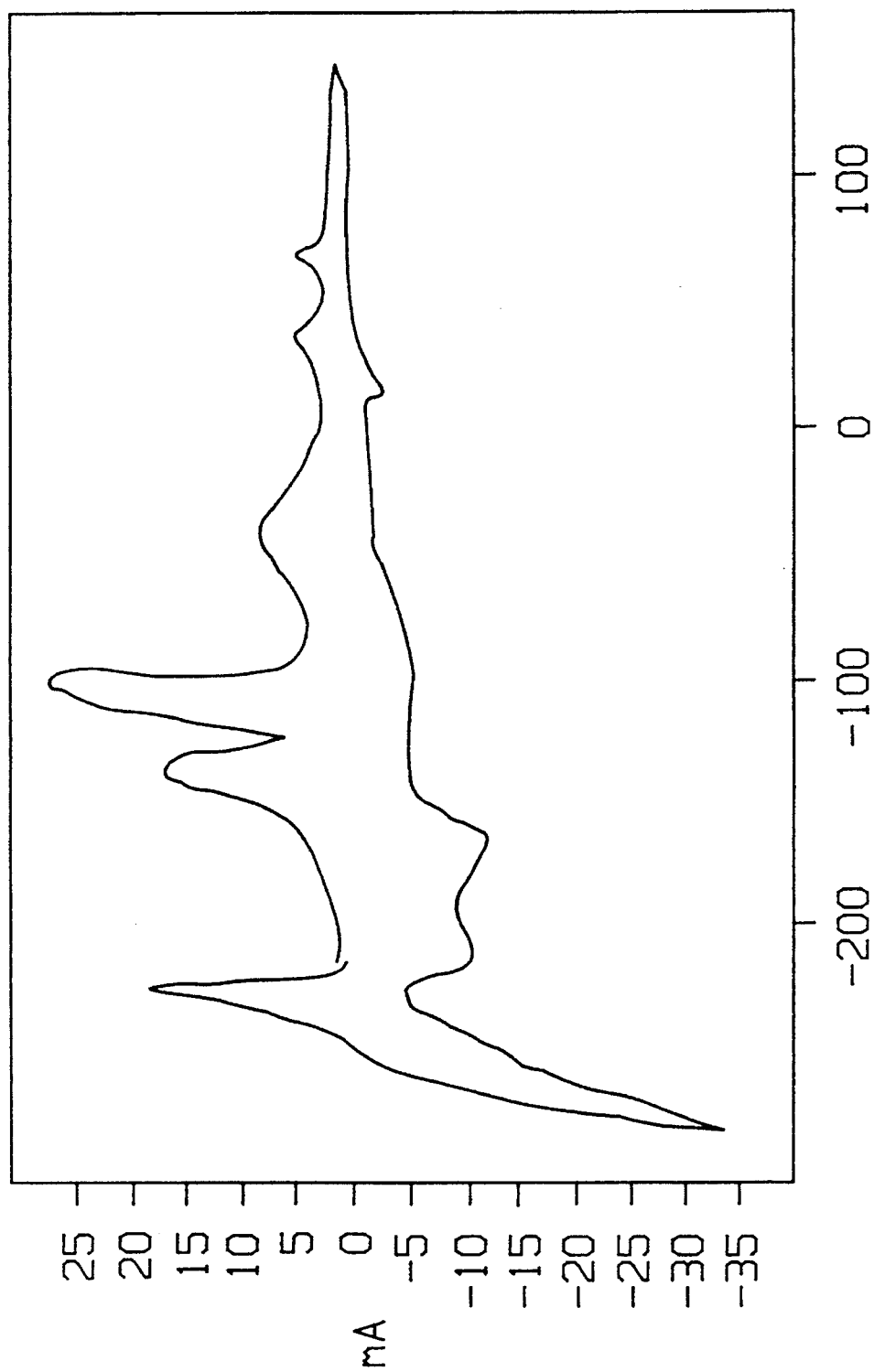
FIG. 3 is a graph of the cyclic voltamogram of Li alloyed with Si—Ni (composition of 50 mg $NiSi_{1.3}$) at 400° C. in a LiCl—LiBr—KBr electrolyte.

FIG. 3 is a cyclic voltamogram of Li—$NiSi_{1.3}$ at a scan rate of 0.02 mV/sec. the alloy Li—$NiSi_{1.3}$ has the further improved the performance of the material tested with a greater capacity at a discharge potential –100 mVolts or more negative than LiAl.

Figure 4:
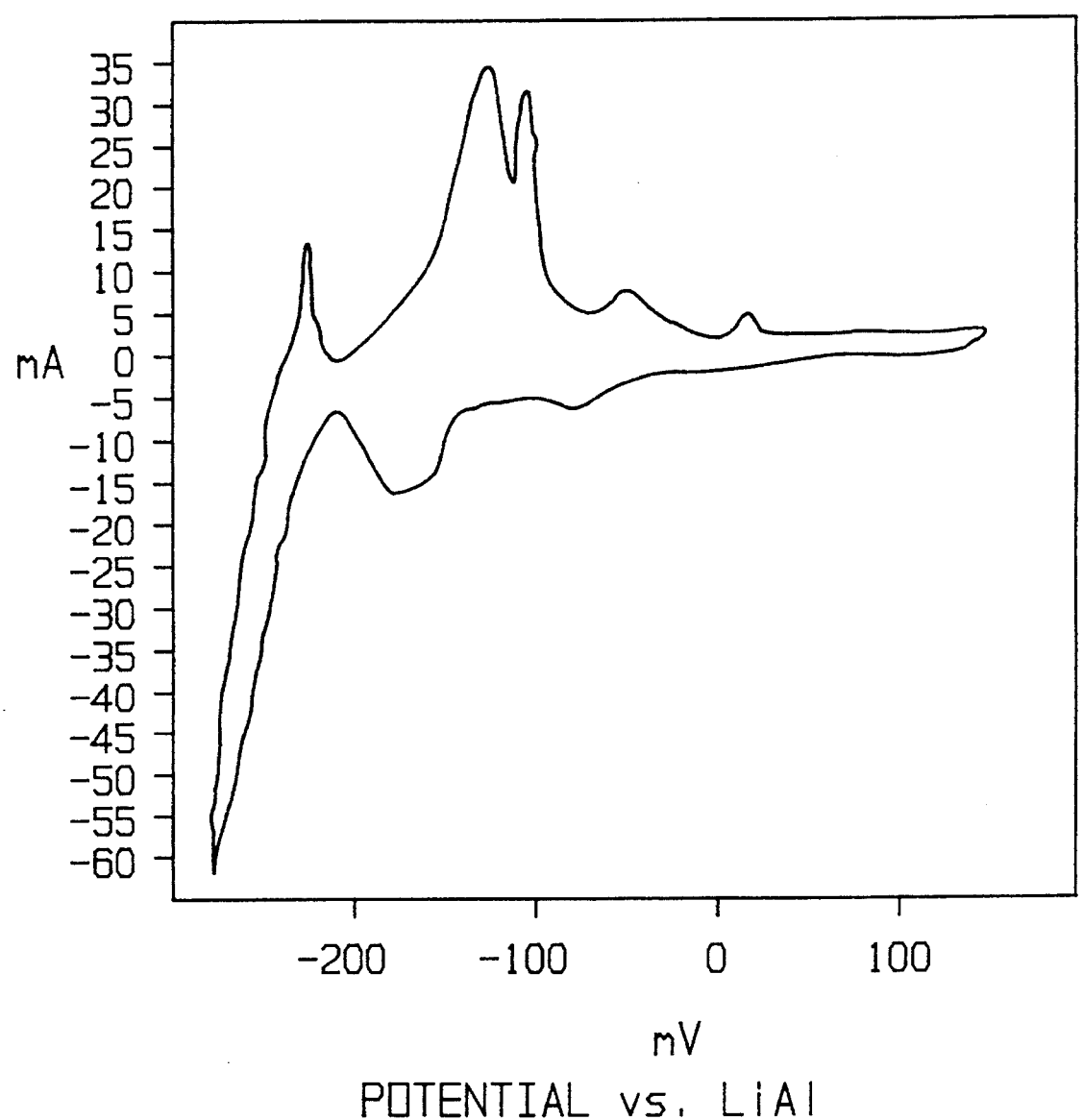
FIG. 4 is a graph of the cyclic voltamogram of Li alloyed with Si—Ni (composition of 50 mg NiSi) at 400° C. in a LiCl—LiBr—KBr electrolyte.

FIG. 4 is a cyclic voltamogram of Li—NiSi at a scan rate of 0.02mV/sec. the alloy Li—NiSi has an even greater capacity at a discharge potential –150 mVolts versus LiAl indicative of improved cell power.

Figure 5:
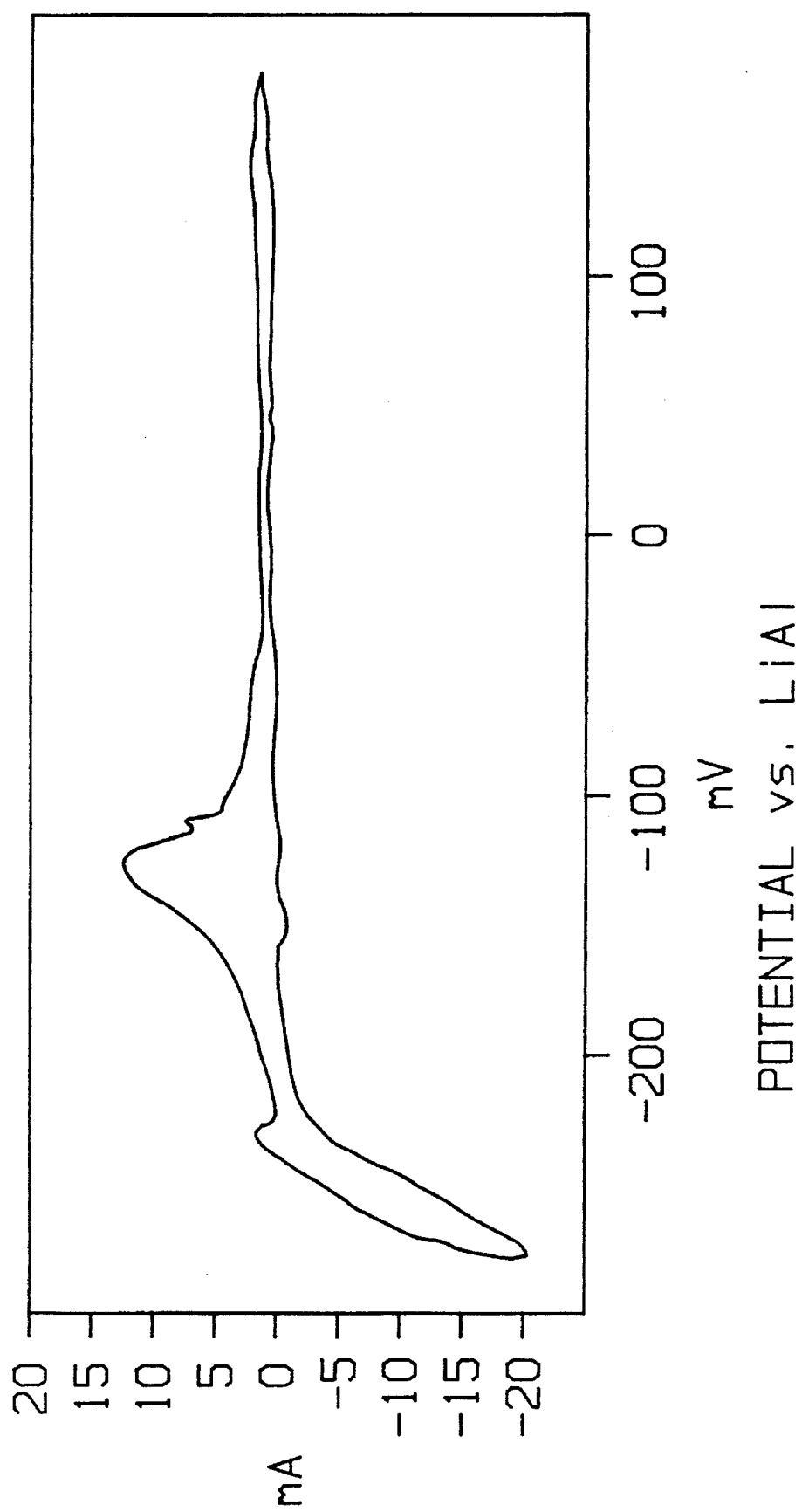
FIG. 5 is a graph of the cyclic voltamogram of Li alloyed with Si—Ni (composition of 50 mg $Ni_{2.6}Si_{2.0}$) at 400° C. in a LiCl—LiBr—KBr electrolyte.

FIG. 5 is a cyclic voltamogram showing the capacity and potential of Li—$Ni_{2.6}Si_{2.0}$ at a scan rate of 0.02 mV/sec.

Li—$Ni_{2.6}Si_{2.0}$ has a good discharge potential of –130 mVolts versus LiAL with reasonably good capacity and very little capacity at positive potential from LiAl.

Figure 6:
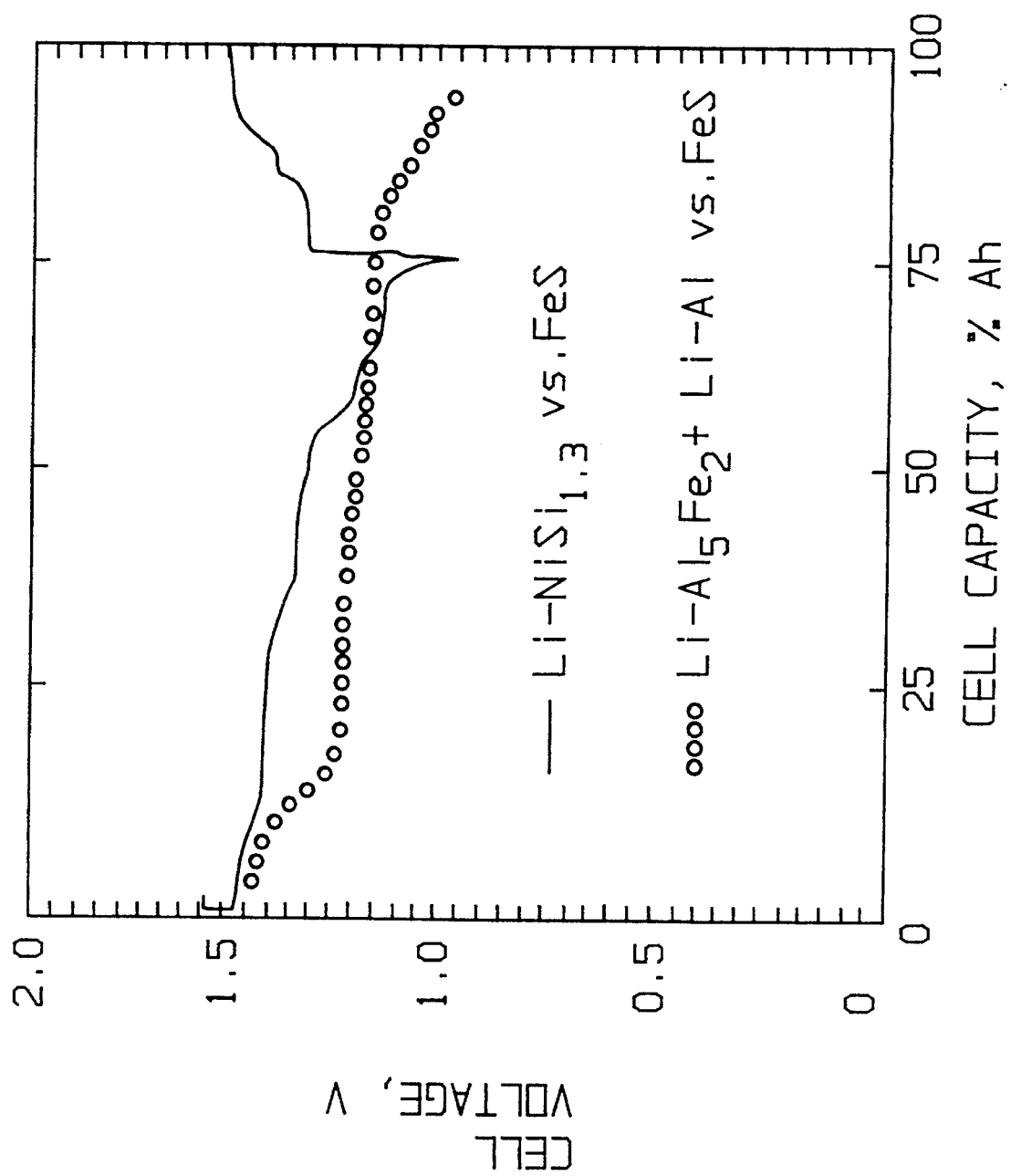
FIG. 6 is a graph showing the voltage versus capacity of Li—$NiSi_{13}$ versus upper plateau $FeS_{13}$ cell compared to the conventional Li—AL versus upper plateau FeS cell.

FIG. 6 is a graphically demonstrates the voltage versus capacity of the Li—$NiSi_{1.3}$ versus upper plateau FeS cell compared to the conventional Li—AL versus upper plateau FeS cell. FIG. 6 demonstrates that Li—$NiSi_{1.3}$ has a greater voltage at 80% depth of discharge than the current Li—Al cell.

Figure 7:
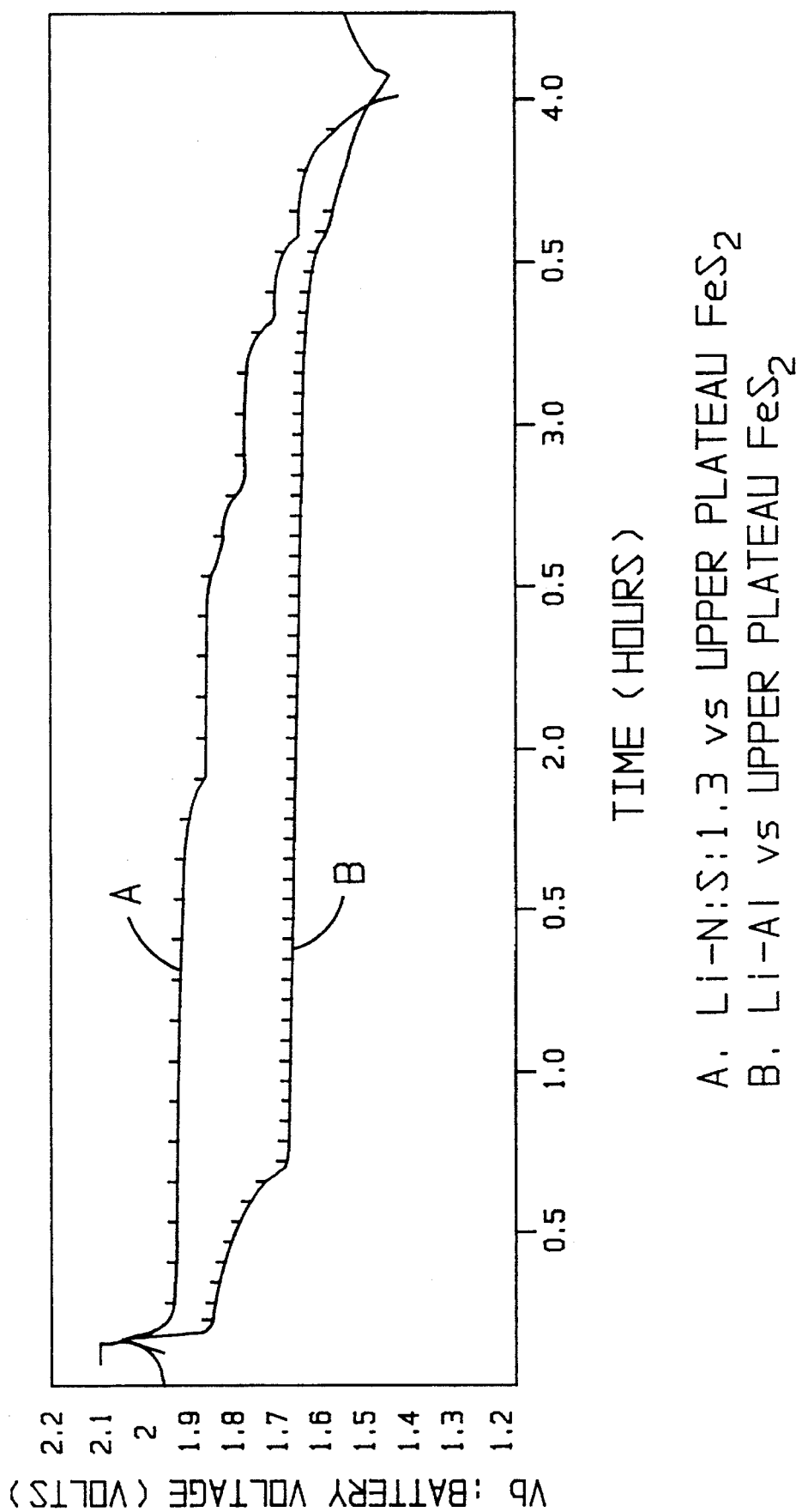
FIG. 7 is a graph showing the voltage versus capacity of Li—$NiSi_3$ versus upper plateau $FeS_2$ cell compared to the conventional Li—AL versus upper plateau $FeS_2$.

FIG. 7 is a graphically demonstrates the voltage versus capacity of the Li—$NiSi_{1.3}$ versus upper plateau $FeS_2$ cell compared to the conventional Li—Al versus upper plateau $FeS_2$ cell. FIG. 7 demonstrates that Li—$NiSi_{1.3}$ has a greater voltage at 80% depth of discharge than the conventional Li—Al cell.

EXAMPLES

1. A negative electrode composition including 70 atom percent lithium, 17 atom percent silicon and 13 atom percent nickel, whereby lithium activity and average cell voltage on discharge are increased. Also, lithium activity at 90 to 100 percent state of charge is commensurate with overcharge tolerance (–200m Volts versus $\alpha LiAl+\beta LiAl$ reference).

2. A secondary electrochemical cell having a positive electrode and a negative electrode, and an electrolyte, wherein said positive electrode contains iron disulfide, said negative electrode having a formed particulate mixture of a lithium-silicon-nickel, wherein lithium is present at 70 atom percent, silicon is present at 17 atom percent, and nickel is present at 13 atom percent and said electrolyte having lithium and halide ions in an amount not less than 15 volume percent of the negative electrode, providing ionic communication between said positive and negative electrodes.

The embodiments of the invention in which an exclusive property or privilege is claimed are defined as follows:

1. A negative electrode composition comprising a ternary alloy consisting essentially of alloyed to a silicon-nickel substrate, lithium being in a range of from about 0.1 to about 70 atom percent, silicon being in a range of from about 17 to about 57 atom percent, and nickel being in a range of from about 13 to about 43 atom percent.

2. The negative electrode composition of claim 1 wherein said negative electrode comprises a formed particulate mixture.

3. The negative electrode composition of claim 1, wherein lithium is present at 70 atom percent, silicon is present at 17 atom percent and nickel is present at 13 atom percent where lithium activity and a higher cell voltage near full charge are increased and overcharge tolerance is created.

4. The negative of claim 1, wherein the substrate consists essentially of nickel-silicon in a range of $NiSi_2$ to $Ni_{2.6}Si_{2.0}$.

5. A secondary electrochemical cell having a positive electrode and a negative electrode, and an electrolyte, said positive electrode comprising a ternary alloy composition consisting essentially of an active material of a transition metal chalcogenides, said negative electrode comprising a formed particulate of a lithium alloy on a silicon and nickel substrate, and said electrolyte comprising lithium and halide ions providing ionic communication between said positive and negative electrodes.

6. The cell of claim 5, wherein said positive electrode contains iron disulfide and said ternary alloy composition of said negative consists essentially of lithium in the range of from about 0.1 to about less than 70 atom percent silicon in a range of from about 17 to about 57, and nickel in a range of from about 13 to about 43 atom percent of said negative electrode composition.

7. The cell of claim 5 wherein said cell contains electrolyte in an amount not less than about 15 volume percent of the negative electrode.

8. The cell of claim 1, wherein said positive electrode contains iron disulfide, and said negative electrode contains a ternary alloy consisting essentially of lithium alloyed to a silicon-nickel substrate, lithium at 70 atom percent, silicon at 17 atom percent, and nickel at 13 atom percent and said electrode contains lithium and halide ions in an amount not less than 15 volume percent of the negative electrode.

* * * * *